United States Patent
Xie

(10) Patent No.: US 9,467,649 B2
(45) Date of Patent: Oct. 11, 2016

(54) METHOD AND SYSTEM FOR SWITCHING MULTI-SCREEN ON VIDEO CONFERENCE

(71) Applicant: ZTE Corporation, Shenzhen (CN)

(72) Inventor: Lunpeng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/650,723

(22) PCT Filed: Oct. 24, 2013

(86) PCT No.: PCT/CN2013/085903
§ 371 (c)(1),
(2) Date: Oct. 5, 2015

(87) PCT Pub. No.: WO2014/090047
PCT Pub. Date: Jun. 19, 2014

(65) Prior Publication Data
US 2016/0014370 A1    Jan. 14, 2016

(30) Foreign Application Priority Data

Dec. 10, 2012    (CN) .......................... 2012 1 0525887

(51) Int. Cl.
*H04N 7/15*    (2006.01)
*H04N 7/14*    (2006.01)
*H04L 29/06*   (2006.01)

(52) U.S. Cl.
CPC .......... *H04N 7/142* (2013.01); *H04L 65/1059* (2013.01); *H04L 65/1083* (2013.01); *H04N 7/147* (2013.01); *H04N 7/15* (2013.01); *H04N 7/152* (2013.01)

(58) Field of Classification Search
CPC .. H04N 7/142; H04N 7/147; H04L 65/1059; H04L 65/1083
USPC ....................................................... 348/14.02
See application file for complete search history.

(56) References Cited

U.S. PATENT DOCUMENTS

| | | | |
|---|---|---|---|
| 2008/0079801 | A1 | 4/2008 | Eri |
| 2010/0333004 | A1 | 12/2010 | Kristiansen |
| 2011/0090302 | A1 | 4/2011 | Leviav |
| 2012/0200658 | A1 | 8/2012 | Duckworth |
| 2012/0274731 | A1 | 11/2012 | Shanmukhadas |
| 2015/0381936 | A1* | 12/2015 | Goyal ...................... H04N 7/15 348/14.06 |

FOREIGN PATENT DOCUMENTS

| CN | 101340550 A | 1/2009 |
|---|---|---|
| CN | 102088440 A | 6/2011 |

OTHER PUBLICATIONS

International Search Report for corresponding application PCT/CN2013/085903 filed Oct. 24, 2013; Mail date Jan. 30, 2014.
European Search Report for corresponding application EP 13 86 2766; Report issued Nov. 10, 2015.

* cited by examiner

*Primary Examiner* — Creighton Smith
(74) *Attorney, Agent, or Firm* — Cantor Colburn LLP

(57) ABSTRACT

The present invention relates to multi-screen video image control. Disclosed are a method and system for switching the multi-screen on the video conference. The method comprises: a multi-screen switching device generates, according to a user input, a switch control message used for controlling the number of the multi-screen and a layout of the multi-screen, and sends the switching control message to an MCU or a video conference terminal; when the switching control message is sent to the MCU, the MCU switches, according to the switching control message, the number of the multi-screen or the layout of the multi-screen of each video conference terminal; and/or, when the switching control message is sent to the video conference terminal, the video conference terminal switches, according to the switching control message, the number of the multi-screen or the layout of the multi-screen of the video conference terminal.

14 Claims, 9 Drawing Sheets

METHOD AND SYSTEM FOR SWITCHING MULTI-SCREEN ON VIDEO CONFERENCE

TECHNICAL FIELD

The present invention relates to a technique for controlling the multi-screen of the video image, and including the video monitoring and a method and system for switching multi-screen on video conference.

BACKGROUND ART

At present, the operations for switching the number of the multi-screen of the video conference, the layout of the multi-screen of the video conference, and appointing the sub-screen are usually performed in a web interface of a computer (PC), and necessarily by the aid of a PC console, multi-screen selection information of a user is issued to a Multi-Control Unit (MCU), so as to control the switching of the multi-screen; and this method for controlling the multi-screen is unitary and not flexible.

SUMMARY OF THE INVENTION

A method and system for switching multi-screen on video conference are provided in the embodiment of the present invention, which can better solve the problem that the method for controlling to switch the multi-screen is inflexible.

According to one aspect of the embodiments of the present invention, a method for switching multi-screen on video conference is provided, comprising: a multi-screen switching device generating, according to a user input, a switching control message used for controlling the number of the multi-screen or a layout of the multi-screen, and sending the switching control message to a Multi-Control Unit (MCU) or a video conference terminal; when the switching control message is sent to the MCU, the MCU switching, according to the switching control message, the number of the multi-screen or the layout of the multi-screen of each video conference terminal; and/or, when the switching control message is sent to the video conference terminal, the video conference terminal switching, according to the switching control message, the number of the multi-screen or the layout of the multi-screen of the video conference terminal.

In an example embodiment, the multi-screen switching device generates, by a multi-screen distributing element in the multi-screen switching device, a switching control message carrying multi-screen distribution list information.

In an example embodiment, the multi-screen switching device generates, by a multi-screen layout element in the multi-screen switching device, a switching control message carrying multi-screen layout list information.

In an example embodiment, the method further comprises: when the multi-screen switching device receives a user input which is used for adding or deleting a sub-screen of a video conference terminal, generating, by a multi-screen assignment element in the multi-screen switching device, a switching control message, and sending the switching control message to the MCU or the video conference terminal, wherein the switching control message carries an adding/deletion instruction, identification information of a video conference terminal of which the sub-screen is to be added/deleted and location information of a to-be-added/deleted sub-screen of the video conference terminal.

In an example embodiment, the method further comprises: when the switching control message is sent to the MCU, adding or deleting, by the MCU, according to the switching control message, the sub-screen, to be added/deleted, of the video conference terminal in an appointed sub-screen position of a position of the multi-screen of all the video conference terminals; and/or, when the switching control message is sent to the video conference terminal, adding or deleting, by the video conference terminal, according to the switching control message, the sub-screen, to be added/deleted, of the video conference terminal in an appointed sub-screen position of the multi-screen of the video conference terminal.

In an example embodiment, the method further comprises: when the multi-screen switching device receives a user input which is used for transferring a sub-screen of the video conference terminal in the multi-screen, generating, by a multi-screen transferring element of the multi-screen switching device, a switching control message, and sending the switching control message to the MCU or the video conference terminal, wherein the switching control message carries a transferring instruction, identification of a video conference terminal to be transferred, information of an original position of the sub-screen and information of a new position of the sub-screen.

In an example embodiment, the method further comprises: when the switching control message is sent to the MCU, transferring, by the MCU, according to the switching control message, the to-be-transferred sub-screen of the video conference terminal, among the multi-screen of all video conference terminals, from the original position of the sub-screen to the new position of the sub-screen; and/or, when the switching control message is sent to the video conference terminal, transferring, by the video conference terminal, according to the switching control message, the to-be-transferred sub-screen of the video conference terminal, among the multi-screen of the video conference terminal, from the original position of the sub-screen to the new position of the sub-screen.

In an example embodiment, the multi-screen switching device is a multi-touch displaying device and/or a remote controller, and sends, through a wireless communication manner comprising a wife manner and/or a Bluetooth method, the switching control message to the MCU or the video conference terminal.

According to another aspect of the present invention, a system for switching multi-screen on video conference is provided, comprising: a multi-screen switching device, configured to generate, according to a user input, a switching control message used for controlling the number of the multi-screen or a layout of the multi-screen, and send the switching control message to a Multi-Control Unit (MCU) or a video conference terminal; the MCU, configured to, when receiving the switching control message, switch, according to the switching control message, the number of the multi-screen or the layout of the multi-screen of each video conference terminal; and/or, the video conference terminal, configured to, when receiving the switching control message, switch, according to the switching control message, the number of the multi-screen or the layout of the multi-screen of the video conference terminal.

In an example embodiment, the multi-screen switch device comprises: a multi-screen distributing element, configured to generate a switching control message carrying multi-screen distribution list information; a multi-screen layout element, configured to generate a switching control message carrying multi-screen layout list information; a multi-screen assignment element, configured to generate a switching control message, and send the switching control message to the MCU or the video conference terminal, wherein the switching control message carries an adding/deletion instruction, identification information of a video conference terminal of which the sub-screen is to be added/deleted and location information of a to-be-added/deleted sub-screen of the video conference terminal; and a multi-screen transferring element, configured to generate a switching control message, and send the switching control message to the MCU or the video conference terminal, wherein the switching control message carries a transferring instruction, identification of a video conference terminal to be transferred, information of an original position of the sub-screen and information of a new position of the sub-screen.

Compared with the related art, the beneficial effect brought by the embodiment of the present disclosure comprises that:

1. The diversity for controlling the multi-screen is enhanced, and the convenience for controlling the multi-screen is improved in the embodiment of the present invention; and 2. A user input operation can be quickly responded in the embodiment of the present invention, which realizes switching of video multi-screen and improves the operation experience of the user.

DESCRIPTION OF EMBODIMENTS

Description is made in detail to example the embodiments of the present invention in conjunction with the figures, and it should be understand that the example embodiments of following description are just used for illustrate and explain the present invention, but not for limit the present invention.

The embodiments of the present invention can control the number of the multi-screen, the layout of the multi-screen and selecting a terminal participating a conference in the multi-screen can be controlled in the embodiment of the present invention. In a video conference system, a multi-screen switching device comprises but not limited to a hand-held multi-touch display device or a remote controller, and the multi-screen switching device sends switching control message to an MCU or a receiver of a video conferencing terminal in a wireless communication manner such as wife and/or bluetooth or a wired connection manner so as to control to switch the multi-screen. The method comprises but not limited to control the number of the multi-screen and the layout of the multi-screen of a selected conference or to appoint a certain sub-screen in the multi-screen through the scrolling by using a scroll wheel or sliding up and down, or to the left and right by using a hand or a stylus on a multi-touch display device, and at the same time, corresponding multi-screen may also be directly switched to by using the hand or stylus to click the corresponding number of the screens. The method further comprises that the various layouts of the multi-screen are displayed on a displayer, and an MCU or a video conference terminal is controlled to switch the multi-screen through key information sent by a remote controller.

Figure 1:
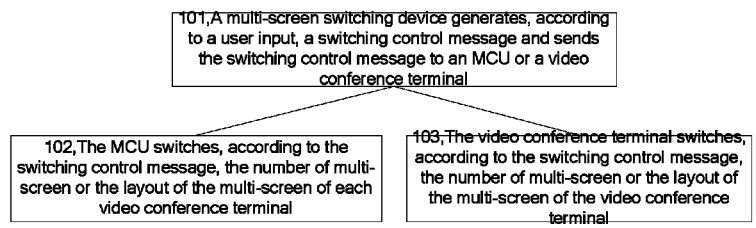
FIG. 1 is a principle block diagram of a method for switching multi-screen on a video conference according to an embodiment of the present invention.

FIG. 1 is a principle block diagram of a method for switching multi-screen on a video conference according to an embodiment of the present invention, and as shown in FIG. 1, steps comprise:

Step 101, a multi-screen switching device generates, according to a user input, a switching control message used for controlling the number of the multi-screen or a layout of the multi-screen, and sends the switching control message to an MCU or a video conference terminal.

In step 101, the multi-screen switching device uses a multi-screen distributing element in the multi-screen switching device to generate a switching control message carrying multi-screen distribution list information, and uses a multi-screen layout element in the multi-screen switching device, to generate a switching control message carrying multi-screen layout list information.

Step 102, when the switching control message is sent to the MCU, the MCU switches, according to the switching control message, the number of the multi-screen or the layout of the multi-screen of each video conference terminal.

Step 103, when the switching control message is sent to the video conference terminal, the video conference terminal switches, according to the switching control message, the number of the multi-screen or the layout of the multi-screen of the video conference terminal.

In an optional manner, when the multi-screen switching device receives a user input which is used for adding or deleting a sub-screen of a video conference terminal, a multi-screen assignment element in the multi-screen switching device is used to generate a switching control message, and the switching control message is sent to the MCU or the video conference terminal, wherein the switching control message carries an adding/deletion instruction, identification information of a video conference terminal of which the sub-screen is to be added/deleted and location information of a to-be-added/deleted sub-screen of the video conference terminal. When the switching control message is sent to the MCU, the MCU adds/deletes, according to the switching control message, the sub-screen, to be added/deleted, of the video conference terminal in an appointed sub-screen position of the multi-screen of all the video conference terminals; and when the switching control message is sent to the video conference terminal, the video conference terminal adds/deletes, by the video conference terminal, according to the switching control message, the sub-screen, to be added/deleted, of the video conference terminal in an appointed sub-screen position of the multi-screen of the video conference terminal When receiving a user input which is used for transferring a sub-screen of the video conference terminal, the multi-screen switching device generates a switching control message by using a multi-screen transferring element of the multi-screen switching device, and, and sends the switching control message to the MCU or the video conference terminal, wherein the switching control message carries a transferring instruction, identification of a video conference terminal to be transferred, information of an original position of the sub-screen and information of a new position of the sub-screen. When the switching control message is sent to the MCU, the MCU transfers, according to the switching control message, the to-be-transferred sub-screen of the video conference terminal, among the multi-screen of all video conference terminals, from the original position of the sub-screen to the new position of the sub-screen; and when the switching control message is sent to the video conference terminal, the video conference terminal transfers, according to the switching control message, the to-be-transferred sub-screen of the video conference terminal, among the multi-screen of the video conference terminal, from the original position of the sub-screen to the new position of the sub-screen.

At present, no matter the MCU or the video conference terminal, the switching of the multi-screen must be performed by means of a traditional web console; however, in order to improve user experience and the convenience for a user using the multi-screen, a method and device for switching the multi-screen are provided in the embodiment of the present invention; on a multi-touch display device, the number of the multi-screen and the layout of the multi-screen, or a certain selected sub-screen terminal image in the multi-screen are controlled by the scrolling of a scroll wheel or by fingers and stylus trajectory tracking; or the multi-screen displayed on a display screen is controlled in real time through a key control message of a remote controller and sent to the MCU or a receiving component of the video conference terminal.

Figure 2:
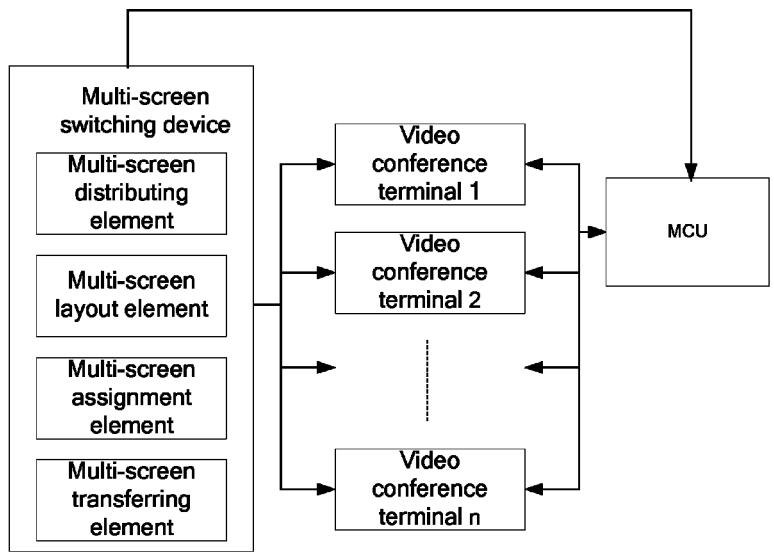
FIG. 2 is a structure block diagram of a system for switching multi-screen on video conference according to an embodiment of the present invention.

FIG. 2 is a structure block diagram of a system for switching multi-screen on video conference according to an embodiment of the present invention; and shown in FIG. 2, the system comprises but not limited to the multi-screen switching device, MCU and multiple video conference terminals.

The multi-screen switching device, configured to generate, according to a user input, a switching control message used for controlling the number of the multi-screen or the layout of the multi-screen, and send the switching control message to an MCU or a video conference terminal;

the MCU, configured, when receiving the switching control message, switch, according to the switching control message, the number of the multi-screen or a layout of the multi-screen of each video conference terminal;

the video conferencing terminal, configured to, when receiving the switching control message, switch, according to the switching control message, the number of the multi-screen or the layout of the multi-screen of the video conference terminal.

The multi-screen switching device comprises:

a multi-screen distributing element, configured to generate a switching control message carrying multi-screen distribution list information;

a multi-screen layout element, configured to generate a switching control message carrying multi-screen layout list information;

a multi-screen assignment element, configured to generate a switching control message, and send the switching control message to the MCU or the video conference terminal, wherein the switching control message carries an adding/deletion instruction, identification information of a video conference terminal of which the sub-screen is to be added/deleted and location information of a to-be-added/deleted sub-screen of the video conference terminal;

and a multi-screen transferring element, configured to generate a switching control message, and send the switching control message to the MCU or the video conference terminal, wherein the switching control message carries a transferring instruction, identification of a video conference terminal to be transferred, information of an original position of the sub-screen and information of a new position of the sub-screen.

The multi-screen switching device sends the switching control message to an MCU or a receiver of a video conference terminal in a wireless communication manner such as wife and/or bluetooth or a wired connection manner.

The multi-screen switching device uses the multi-screen distributing element, the multi-screen layout element, the multi-screen assignment element, or the multi-screen transferring element to generate a switching control message of corresponding functions, and sends the switching control message to the MCU or the video conference terminal. When the MCU receives the switching control message, according to the content of the switching control message, all video conferencing terminals (n) on a conference is controlled to switch the multi-screen. When a certain video conference terminal receives the switching control message, through interaction with the MCU and according to the content of the switching control message, the multi-screen displayed by the video conferencing terminal is controlled.

The multi-screen switching device may be a multi-touch display device, and also may be a remote controller.

The multi-touch display device may be with several evident features:

1. providing a multi-touch function;
2. functions of being able to display the number of the multi-screen and the layout of the multi-screen, etc.; and
3. being able to generate a switching control message of the multi-screen selected by the user, and sending the switching control message to the MCU or the video conference terminal in a wireless manner, such as wifi and bluetooth.

In the following, taking a multi-touch display device as an example, the embodiments of the present invention are described in detail through FIG. 3 to FIG. 10.

Due to the limitation for controlling the multi-screen in the related art, the embodiments control the number of the multi-screen of the conference, the layout of the multi-screen of the conference, or a terminal participating a conference are controlled by using a stylus or hand to slide up and down, or to left and right on the multi-touch display device or by scrolling a scroll wheel on the multi-touch display device. The multi-touch display device sends a final selection result of a user to the MCU or the video conference terminal in a wireless communication manner such as Wifi and/or bluetooth, and after the MCU or video conference terminal receives information sent by the multi-touch display device, the number of the multi-screen, the layout of the multi-screen or the terminal participating the conference is modified. When the result is sent to the MCU, the number of the multi-screen, the layout of the multi-screen of each video conference terminal on the conference or the terminal participating the conference are modified; and when the result is sent to the video conference terminal; at the moment, by interacting with the MCU, the video conference terminal merely modifies the number of the multi-screen, the layout of the multi-screen or the terminal participating the conference, and the multi-screen display of other video conference terminals of the conference is not changed.

Figure 3:
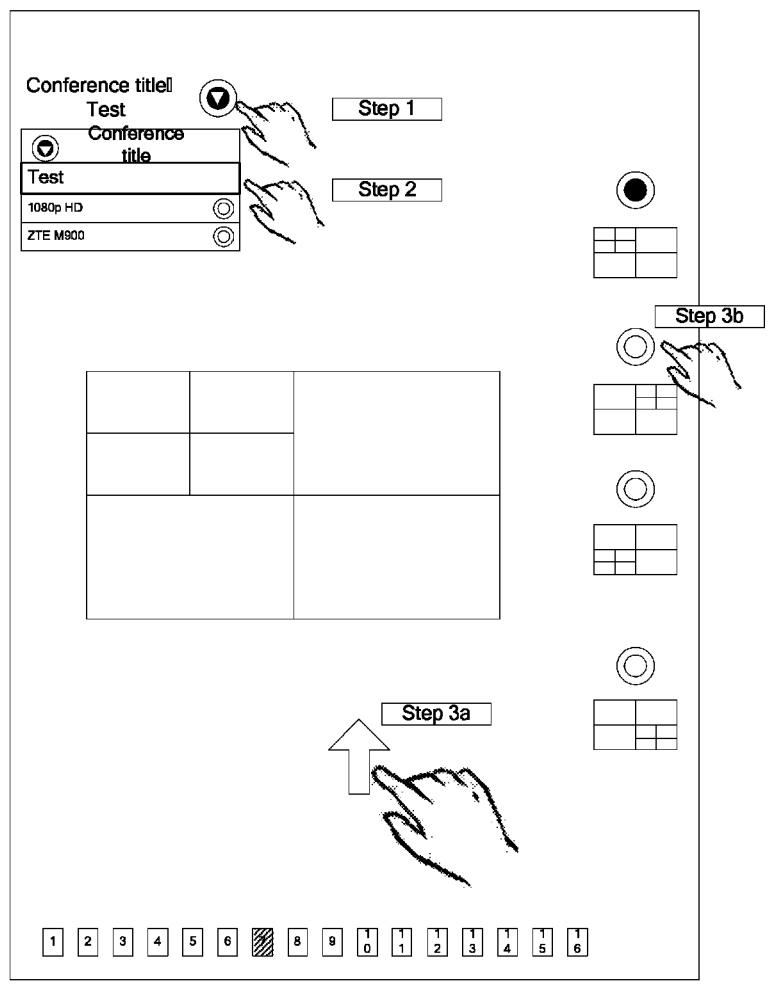
FIG. 3 is a schematic diagram of a finger or stylus touching to click a conference selection and sliding according to the embodiment of the present invention.
Figure 4:
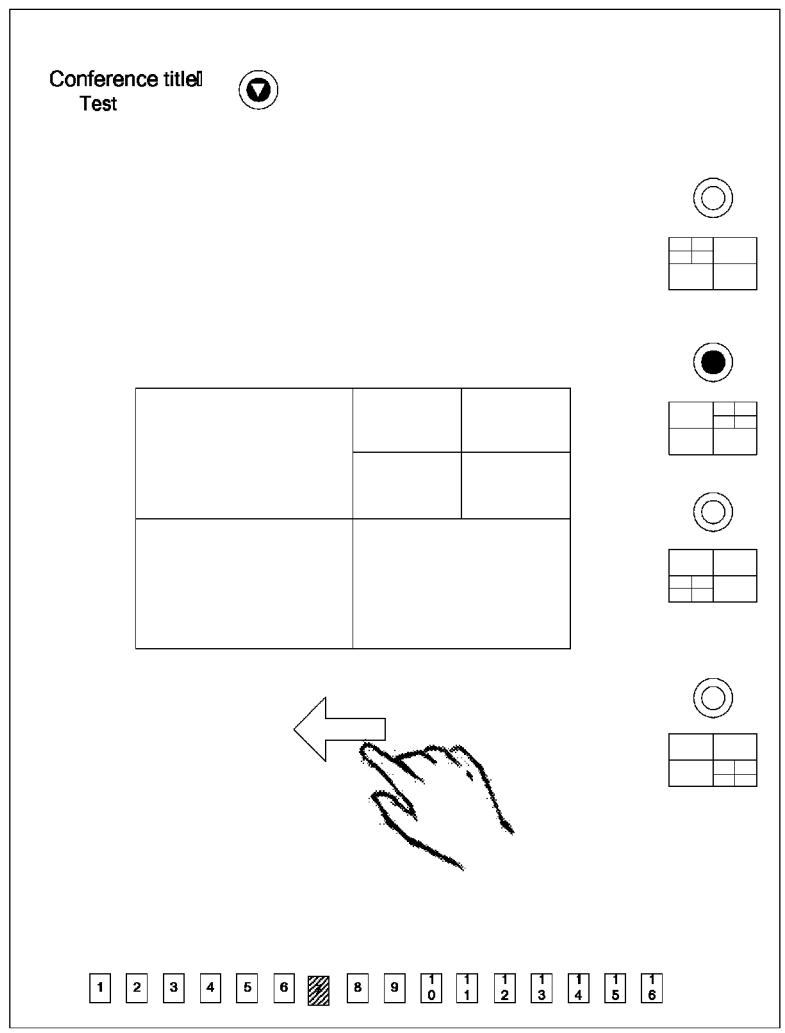
FIG. 4 is schematic diagram of sliding and switching the number of the multi-screen on a touch screen through a finger or stylus according to the embodiment of the present invention.
Figure 5:
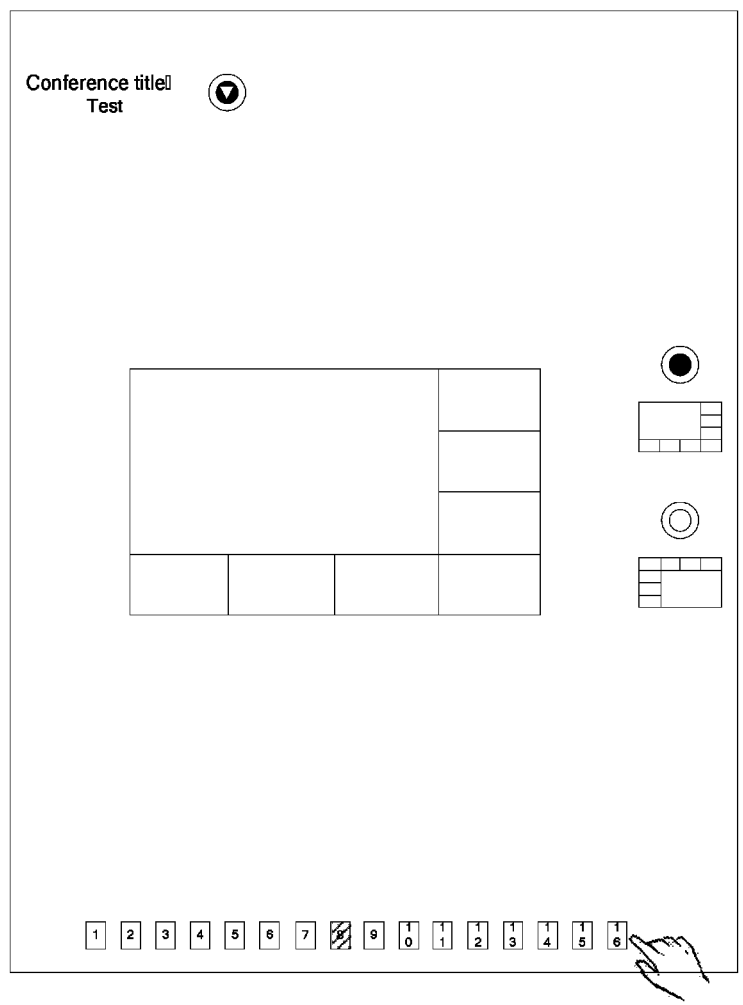
FIG. 5 is schematic diagram of directly switching the number of the multi-screen by a finger or stylus directly touching a multi-screen number button area on a touch screen according to the embodiment of the present invention.

A user selects a conference wanting to be controlled on a multi-touch display device through a finger or stylus, as shown in step 1 and step 2 of FIG. 3. After the conference is selected, the multi-screen of a corresponding conference may be controlled, by sliding a finger or stylus on a touch screen of a multi-touch display device, for example, sliding up, as shown in step 3a of FIG. 3, the layout of the multi-screen is selected to be a next layout, and when sliding down, the layout of the multi-screen is selected to be a former layout; and the switching from FIG. 3 to FIG. 4 is the result of using a finger or stylus to slide up on the multi-touch display device. When sliding to right, the number of the multi-screen decreases, and when sliding to left, the number of the multi-screen increases; and FIG. 4 to FIG. 5 is a result of the finger or stylus sliding to left on the multi-touch display device. Further, the effect of the operations of the finger or stylus may also be achieved by the scrolling operations of a scroll wheel on the device.

Figure 6:
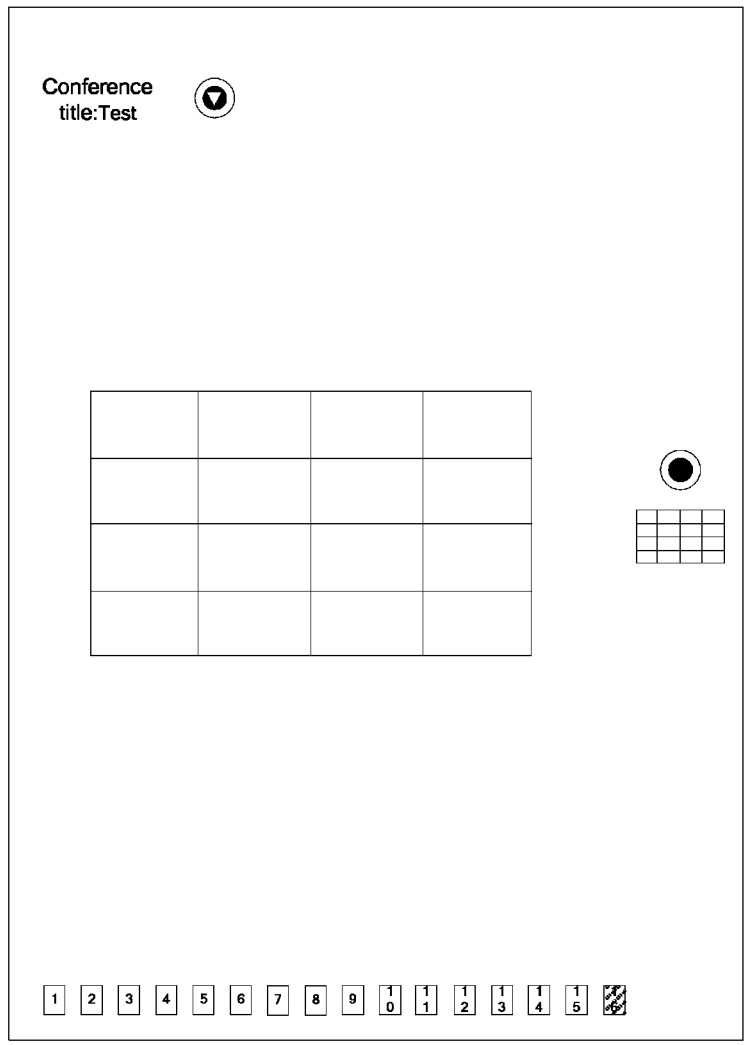
FIG. 6 is a state schematic diagram after a conference switches to 16 screens according to the embodiment of the present invention.

In the switching of the number of the multi-screen, a desired number of the multi-screen may be directly switched to by a finger or stylus clicking a corresponding small button of the number of the multi-screen on the multi-touch display device. As shown in FIG. 5, when it needs to switch from a screen with 8 screens to a screen with 16 screens, the screen with 16 screens may be directly switched to by directly clicking a touch area corresponding to the screen with 16 screens. The switching from FIG. 5 to FIG. 6 is a result of using a finger or stylus to click the touch area corresponding to the screen with 16 screens of the multi-touch display device.

Figure 7:
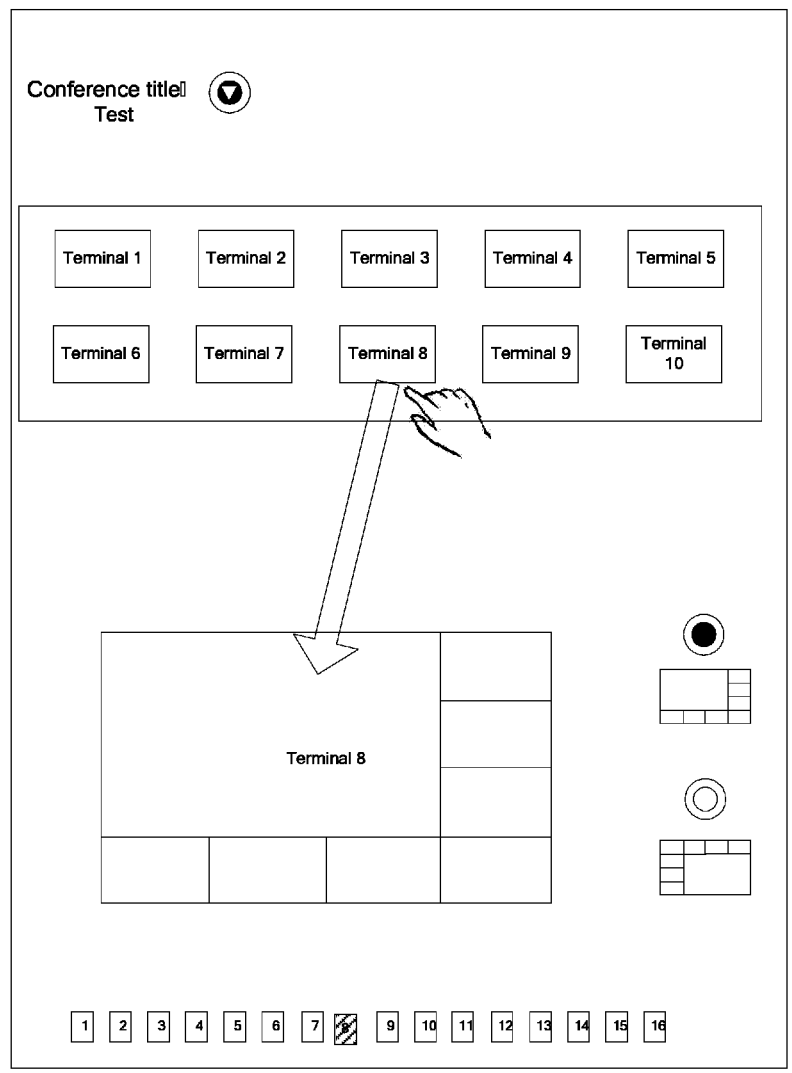
FIG. 7 is a schematic diagram of selecting a terminal from a terminal list to add same to a sub-screen of multi-screen according to the embodiment of the present invention.
Figure 8:
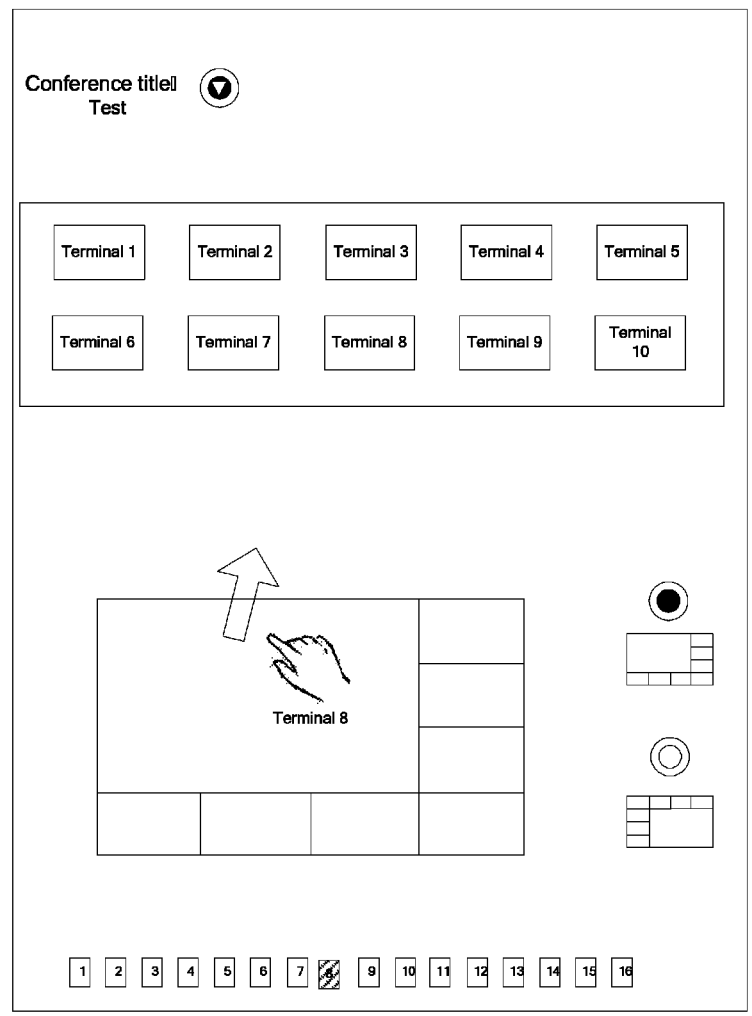
FIG. 8 is a schematic diagram of removing a terminal image corresponding to a sub-screen of the multi-screen according to the embodiment of the present invention.

10 conference video terminals are provided in the embodiment of the present invention; when it needs to add a certain conference video terminal to a certain sub-screen position of the multi-screen, a finger or stylus is used to slide from the touch area of the video conference terminal to the sub-screen position touch area on the multi-touch display device, and the screen of the video conference terminal is made to be displayed on the sub-screen position, and as shown in FIG. 7, it is a schematic diagram of selecting a video conference terminal 8 from a video conference terminal list and adding the video conference terminal 8 to a sub-screen of the multi-screen.

Likewise, when a screen of a certain video conference terminal needs to be deleted from the multi-screen, it only needs to use a finger or stylus to slide on a multi-touch display device from the position touch area of the sub-screen of the video conferencing terminal to the outside of the position touch area of the multi-screen, and as shown in FIG. 7, it is a schematic diagram of deleting a video conference terminal 8 corresponding to a sub-screen of the multi-screen.

Figure 9:
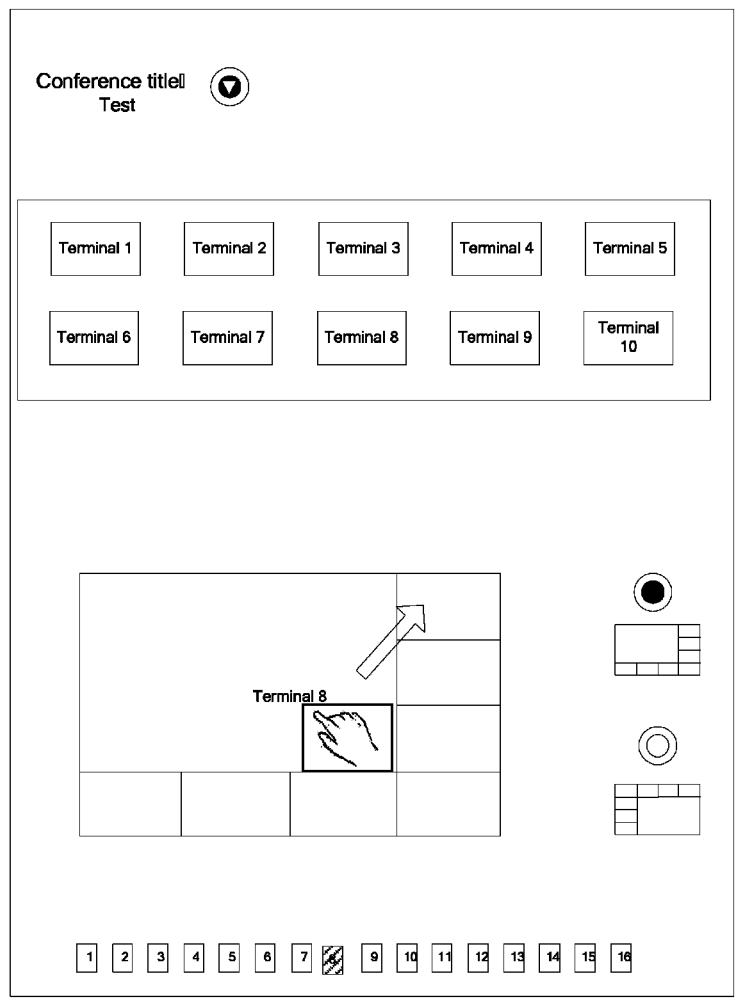
FIG. 9 is a schematic diagram of adding from a sub-screen of the multi-screen to another sub-screen according to the embodiment of the present invention.
Figure 10:
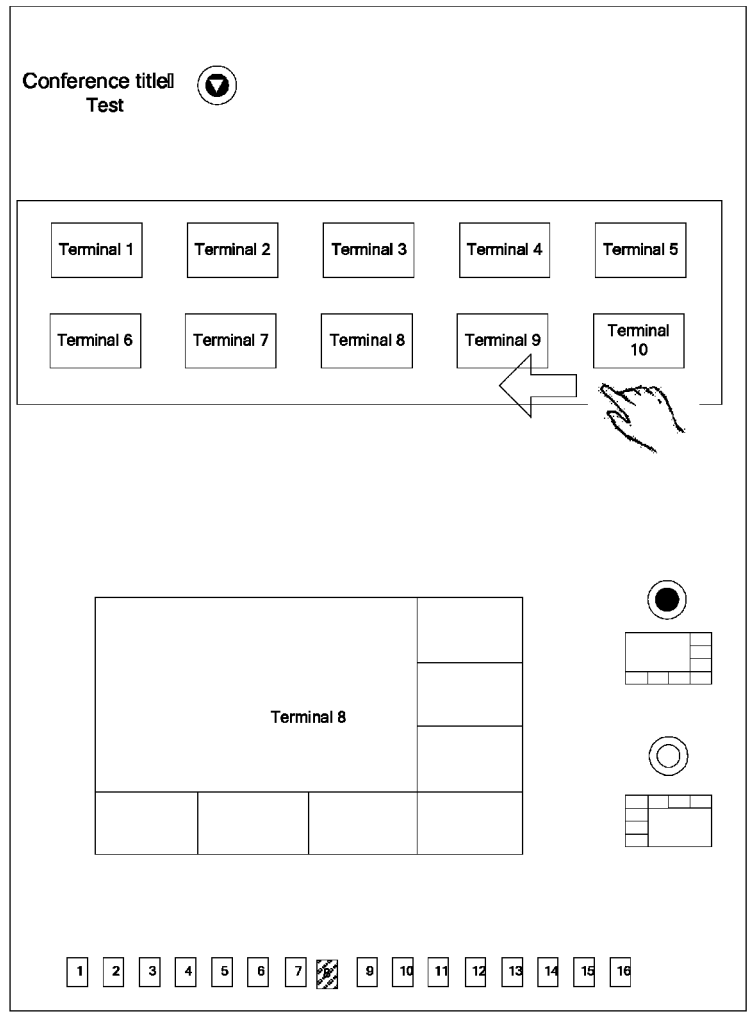
FIG. 10 is a schematic diagram of sliding and displaying a terminal to be selected on a touch screen through a finger or stylus according to the embodiment of the present invention.

When adding from a sub-screen of the multi-screen to another sub-screen, it only needs to use the finger or stylus to side on the multi-touch display device from the position touch area of the current sub-screen of the video conference terminal to the position touch area of the new sub-screen, as shown in FIG. 9. FIG. 10 is a schematic diagram of sliding and displaying 10 terminals to be selected on a touch screen through a finger or a stylus.

Although the above text describes the present disclosure in detail, the present disclosure is not limited to this, and a person skilled in the art may perform various modifications according to principles of the present disclosure. Therefore, any modification made according to the present invention shall fall within the protection scope of the present invention.

INDUSTRIAL APPLICABILITY

The embodiments of the present invention may be applied to a the field of multimedia technologies, which solves the problem that the method for switching the multi-screen is unitary and not flexible, realizes the diversity for controlling the multi-screen, improves the convenience for controlling the multi-screen, can quickly respond to a user input operation and improves the user's operation experience.

The invention claimed is:

1. A method for switching multi-picture on video conference, comprising:
   a multi-picture switching device generating, according to a user input, a switching control message used for controlling the number of the multi-picture or a layout of the multi-picture, and sending the switching control message to a Multi-Control Unit (MCU) or a video conference terminal;
   when the switching control message is sent to the MCU, the MCU switching, according to the switching control message, the number of the multi-picture or the layout of the multi-picture of each video conference terminal; and/or, when the switching control message is sent to the video conference terminal, the video conference terminal switching, according to the switching control message, the number of the multi-picture or the layout of the multi-picture of the video conference terminal;
   wherein the method further comprises: when the multi-picture switching device receives a user input which is used for adding or deleting a sub-picture of a video conference terminal, generating, by a multi-picture assignment element in the multi-picture switching device, a switching control message, and sending the switching control message to the MCU or the video conference terminal, wherein the switching control message carries an adding/deletion instruction, identification information of a video conference terminal of which the sub-picture is to be added/deleted and location information of a to-be-added/deleted sub-picture of the video conference terminal.

2. The method according to claim 1, wherein the multi-picture switching device generates, by a multi-picture distributing element in the multi-picture switching device, a switching control message carrying multi-picture distribution list information.

3. The method according to claim 1, wherein the multi-picture switching device generates, by a multi-picture layout element in the multi-picture switching device, a switching control message carrying multi-picture layout list information.

4. The method according to claim 1, wherein the method further comprises:
   when the switching control message is sent to the MCU, adding or deleting, by the MCU, according to the switching control message, the sub-picture, to be added/deleted, of the video conference terminal in an appointed sub-picture position of a position of the multi-picture of all the video conference terminals; and/or, when the switching control message is sent to the video conference terminal, adding or deleting, by the video conference terminal, according to the switching control message, the sub-picture, to be added/deleted, of the video conference terminal in an appointed sub-picture position of the multi-picture of the video conference terminal.

5. The method according to claim 1, wherein the method further comprises:

when the multi-picture switching device receives a user input which is used for transferring a sub-picture of the video conference terminal in the multi-picture, generating, by a multi-picture transferring element of the multi-picture switching device, a switching control message, and sending the switching control message to the MCU or the video conference terminal, wherein the switching control message carries a transferring instruction, identification of a video conference terminal to be transferred, information of an original position of the sub-picture and information of a new position of the sub-picture.

6. The method according to claim 5, wherein the method further comprises:

when the switching control message is sent to the MCU, transferring, by the MCU, according to the switching control message, the to-be-transferred sub-picture of the video conference terminal, among the multi-picture of all video conference terminals, from the original position of the sub-picture to the new position of the sub-picture; and/or, when the switching control message is sent to the video conference terminal, transferring, by the video conference terminal, according to the switching control message, the to-be-transferred sub-picture of the video conference terminal, among the multi-picture of the video conference terminal, from the original position of the sub-picture to the new position of the sub-picture.

7. The method according to claim 1, wherein the multi-picture switching device is a multi-touch displaying device and/or a remote controller, and sends, through a wireless communication manner comprising a wifi manner and/or a Bluetooth method, the switching control message to the MCU or the video conference terminal.

8. A system for switching multi-picture on video conference, comprising:

a multi-picture switching device, configured to generate, according to a user input, a switching control message used for controlling the number of the multi-picture or a layout of the multi-picture, and send the switching control message to a Multi-Control Unit (MCU) or a video conference terminal;

the MCU, configured to, when receiving the switching control message, switch, according to the switching control message, the number of the multi-picture or the layout of the multi-picture of each video conference terminal; and/or, the video conference terminal, configured to, when receiving the switching control message, switch, according to the switching control message, the number of the multi-picture or the layout of the multi-picture of the video conference terminal;

wherein the multi-picture switch device comprises: a multi-picture assignment element, configured to generate a switching control message, and send the switching control message to the MCU or the video conference terminal, wherein the switching control message carries an adding/deletion instruction, identification information of a video conference terminal of which the sub-picture is to be added/deleted and location information of a to-be-added/deleted sub-picture of the video conference terminal.

9. The system according to claim 8, wherein the multi-picture switch device further comprises:

a multi-picture distributing element, configured to generate a switching control message carrying multi-picture distribution list information;

a multi-picture layout element, configured to generate a switching control message carrying multi-picture layout list information;

and a multi-picture transferring element, configured to generate a switching control message, and send the switching control message to the MCU or the video conference terminal, wherein the switching control message carries a transferring instruction, identification of a video conference terminal to be transferred, information of an original position of the sub-picture and information of a new position of the sub-picture.

10. The method according to claim 2, wherein the multi-picture switching device is a multi-touch displaying device and/or a remote controller, and sends, through a wireless communication manner comprising a wifi manner and/or a Bluetooth method, the switching control message to the MCU or the video conference terminal.

11. The method according to claim 3, wherein the multi-picture switching device is a multi-touch displaying device and/or a remote controller, and sends, through a wireless communication manner comprising a wifi manner and/or a Bluetooth method, the switching control message to the MCU or the video conference terminal.

12. The method according to claim 4, wherein the multi-picture switching device is a multi-touch displaying device and/or a remote controller, and sends, through a wireless communication manner comprising a wifi manner and/or a Bluetooth method, the switching control message to the MCU or the video conference terminal.

13. The method according to claim 5, wherein the multi-picture switching device is a multi-touch displaying device and/or a remote controller, and sends, through a wireless communication manner comprising a wifi manner and/or a Bluetooth method, the switching control message to the MCU or the video conference terminal.

14. The method according to claim 6, wherein the multi-picture switching device is a multi-touch displaying device and/or a remote controller, and sends, through a wireless communication manner comprising a wifi manner and/or a Bluetooth method, the switching control message to the MCU or the video conference terminal.

* * * * *